(12) United States Patent  
Bryham

(10) Patent No.: US 7,520,239 B2
(45) Date of Patent: Apr. 21, 2009

(54) RETRACTABLE LEG ASSEMBLY FOR AMPHIBIOUS VEHICLE

(75) Inventor: Maurice John Bryham, Auckland (NZ)

(73) Assignee: Sealegs International Limited, Auckland (NZ)

( * ) Notice: Subject to any disclaimer, the term of this patent is extended or adjusted under 35 U.S.C. 154(b) by 0 days.

(21) Appl. No.: 10/573,405

(22) PCT Filed: Sep. 27, 2004

(86) PCT No.: PCT/NZ2004/000232

§ 371 (c)(1),
(2), (4) Date: Jun. 27, 2006

(87) PCT Pub. No.: WO2005/028300

PCT Pub. Date: Mar. 31, 2005

(65) Prior Publication Data

US 2007/0001419 A1    Jan. 4, 2007

(30) Foreign Application Priority Data

Sep. 25, 2003   (NZ) .................................... 528471

(51) Int. Cl.
*B60P 3/10* (2006.01)

(52) U.S. Cl. ..................................................... 114/344
(58) Field of Classification Search ................ 114/344; 440/12.5
See application file for complete search history.

(56) References Cited

U.S. PATENT DOCUMENTS

| | | | | |
|---|---|---|---|---|
| 3,344,448 A | * | 10/1967 | Goetz | 114/344 |
| 5,769,021 A | | 6/1998 | Schad | |
| 6,159,058 A | * | 12/2000 | Matheson | 440/12.5 |
| 2002/0017229 A1 | * | 2/2002 | Pavon et al. | 114/344 |

FOREIGN PATENT DOCUMENTS

| | | |
|---|---|---|
| CA | 2273069 | 11/1999 |
| WO | WO 03/035416 | 5/2003 |

* cited by examiner

*Primary Examiner*—Stephen Avila
(74) *Attorney, Agent, or Firm*—Young & Thompson

(57) ABSTRACT

Leg assembly (10) for an amphibious vehicle comprises leg (11) and hydraulic ram (33) each pivotally mounted, above the waterline, externally to hull (17). The line of action of ram (33) is such that it is optimal (eg less than 30 DEG) with respect to the tangent to the arc of travel of leg (11) when it is lowered or raised. Leg (11) carries wheel (13) which may be swivelled for steering using hydraulic linear actuator (15). Assembly (10) is compact, light, yet capable of lifting the vehicle off the ground.

19 Claims, 8 Drawing Sheets

RETRACTABLE LEG ASSEMBLY FOR AMPHIBIOUS VEHICLE

BACKGROUND OF THE INVENTION

1. Field of the Invention

Figure 1:
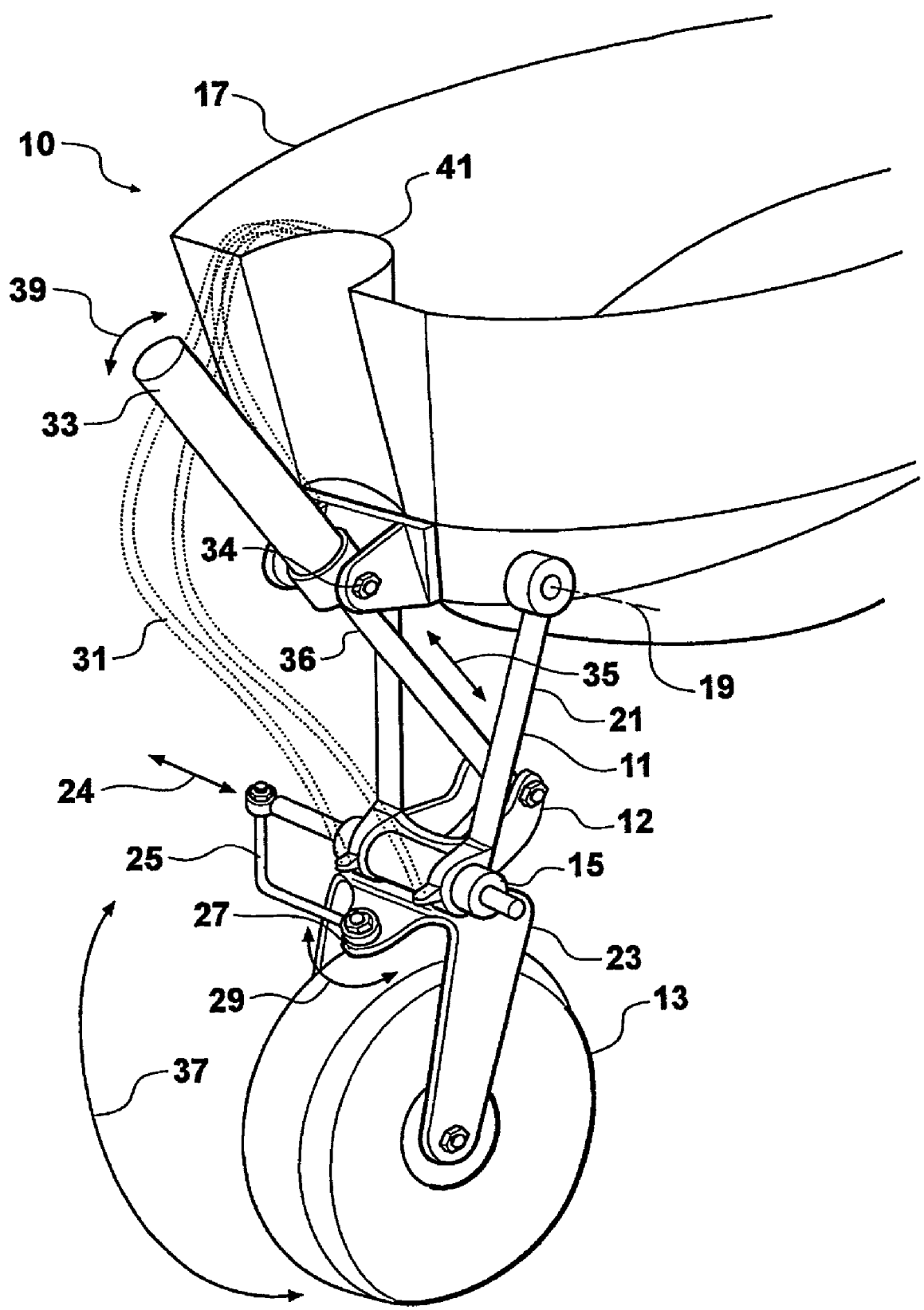

This invention relates to a retractable leg assembly, and in particular, a retractable and steerable leg assembly for use with an amphibious vehicle.

2. Description of the Related Art

Numerous attempts have been made to produce leg assemblies that are suitable for amphibious vehicles. Amphibious vehicles have a number of design challenges, the majority of which centre around the problem of translating the wheels from a deployed position to and from a retracted position.

For the amphibious vehicle to work well on the water, the wheels should be well out of the way, and the hull should retain fairly clean lines, so that drag is minimised. And yet when the vehicle is to be used on land, the tires must be of a suitable size, adequate ground clearance is required, and a method of steering is required.

These diverse requirements have often lead to designs which use significant amounts of space within the vehicle to stow the wheels, and/or have complex systems with doors and seals through which the wheels pass, and when steering is also incorporated, complex methods to engage with some sort of steering system are employed.

Another limitation of previous designs is an inability of the vehicles to retract or extend their wheels when on dry ground, for example to beach the vehicle, or to raise it off the ground again.

This complexity, sometimes coupled with poor use of space, has prevented most of the previous designs from ever becoming a commercial success. Complexity will not only drive costs higher, but also becomes a maintenance burden that is aggravated by operations in salt or fresh water. A simplified solution is required, having the minimum of moving parts, and the least interruption to the watertight structure of the hull of the vehicle, producing the least possible drag when the vehicle is operating on water, using the minimum of space within the hull of the vehicle, and in addition having sufficient power to extend the wheels to raise the vehicle off the ground when required to.

BRIEF SUMMARY OF THE INVENTION

It is therefore an object of the present invention to provide a retractable leg assembly which will at least go some way towards overcoming the above mentioned problems, or at least provide the public with a useful choice.

Accordingly, in a first aspect, the invention may broadly be said to consist in a retractable leg assembly for an amphibious vehicle, comprising;

a leg adapted to be pivotally mountable to the vehicle, and
a linear actuator also adapted to be pivotally mountable to the vehicle and to be operatively connected to the leg, wherein the arrangement of the leg and the actuator once mounted to the vehicle is such that the actuator is adapted to move the leg through an arc of travel from a retracted position to an extended position, and during the travel the actuator moves about its pivotal mount in a manner to ensure that the force exerted on the leg by the actuator in a direction that is tangential to the arc of travel of the leg remains substantially optimal during a portion of the arc of travel.

Those skilled in the art will appreciate that having the linear actuator acting substantially in the direction that is tangential to the arc of travel of the leg, throughout at least a portion of the range of movement of the leg will result in a force being applied to the leg by the actuator which is close to that exerted by the actuator. Such an arrangement produces a leg assembly which is compact and light in weight and yet is capable of lifting the amphibious vehicle off the ground.

The use of a linear actuator is advantageous over the use of a rotary actuator for example, since the linear actuator has very few moving parts and can be protected and maintained in a marine environment with greater ease. Similarly, the pivoting joints used in the leg assembly are relatively easy to protect and maintain even in a marine environment. Also a retractable leg assembly having effectively only two primary moving parts, the leg and the actuator, keeps both initial cost and maintenance to a minimum.

Since the leg assembly is relatively simple, and is suitable for use in a marine environment, the entire assembly can be situated on the outside of the hull of an amphibious vehicle, providing the significant advantage that the amphibious vehicle does not need to be adapted to allow the leg assembly or any part of it to move through the water-tight skin of the vehicle or any moveable doors or fairings.

Preferably the actuator is movable about its pivotal mount in a manner ensuring that the force exerted on the leg by the actuator in a direction that is tangential to the arc of travel of the leg remains substantially optimal during the greater portion of the arc of travel.

Preferably the leg and the linear actuator are both pivotally mounted onto an adapter plate or fixture which is mountable to an amphibious vehicle. Such a configuration would allow a boat manufacturer to incorporate the leg assembly with a minimum of modifications to his boats.

Preferably the arc of travel is sufficient to allow the greater part of the leg to be raised above the water line of the vehicle.

Preferably the leg and linear actuator are so arranged as to form a substantially compact configuration when the leg is in the retracted configuration. This reduces the impact of the leg assembly on living space within the vehicle.

Preferably the linear actuator is positioned external to the substantially water-tight structure of the amphibious vehicle. This keeps such equipment out of the living space of the vehicle, and positions the actuator in a location which is reasonably accessible for maintenance purposes.

Preferably the linear actuator is a hydraulic actuator, as hydraulic actuators have been shown to be reliable in marine environments.

Preferably the retractable leg assembly includes a mounting means for at least one ground engagement means. The ground engagement means could for example be a wheel or a set of tracks.

Preferably the retractable leg assembly includes a steering actuator means which is adapted to control the orientation of the ground engagement means relative to the retractable leg assembly.

Preferably the ground engagement means is a wheel.

Preferably the wheel includes a balloon type tire. Such a tire introduces a shock absorbing capability to the retractable leg assembly.

Preferably the leg assembly is adapted to position the wheel, when in the retracted position, in such a manner that the wheel can be used as a bumper or fender.

Preferably the leg is substantially "V" or triangular shaped, to provide adequate stability for the leg assembly when in use.

Preferably the steering actuator means is a hydraulic actuator.

Optionally the ground engagement means can be powered, for example by the incorporation of a hydraulic motor within the hub of a wheel or a continuous track assembly.

In a second aspect, the invention may broadly be said to consist in an amphibious vehicle incorporating at least one retractable leg assembly substantially as specified herein.

Preferably the path of travel of the leg from the retracted position to the extended position is external from the substantially water-tight structure of the amphibious vehicle, thus eliminating any requirements for complex doors or sealing arrangements etc.

Preferably the steering actuator means is connected in series with a waterborne steering system actuator of the amphibious vehicle. This reduces steering system complexity, for example by eliminating the need for additional controls, or systems to disconnect one or other system during waterborne or ground operations. It also reduces operator workload during transitions from water to ground operations.

Preferably the amphibious vehicle is constructed having pontoons running substantially from the bow of the vehicle to the stern, and the leg when in the retracted position, is positioned adjacent to one end of at least one pontoon. The advantage of this being that the stowage is primarily within the lines of the pontoon and therefore of the amphibious vehicle, without using any of the "living space" of the vehicle. The term "living space" being used to mean space otherwise used by the occupants or their belongings or equipment.

The invention may also broadly be said to consist in the parts, elements and features referred to or indicated in the specification of the application, individually or collectively, and any or all combinations of any two or more of the parts, elements or features, and where specific integers are mentioned herein which have known equivalents, such equivalents are incorporated herein as if they were individually set forth.

BRIEF DESCRIPTION OF THE DRAWING FIGURES

Two preferred forms of the invention will now be described, by way of example only, with reference to the accompanying drawings in which, Example 1

Figure 2:
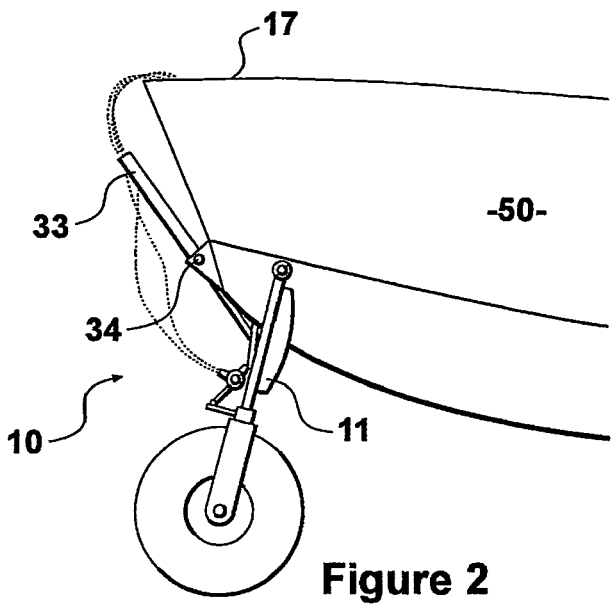
Figure 3:
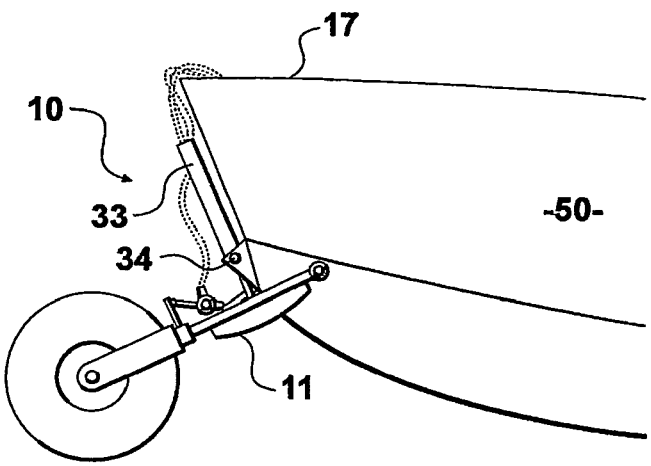
Figure 4:
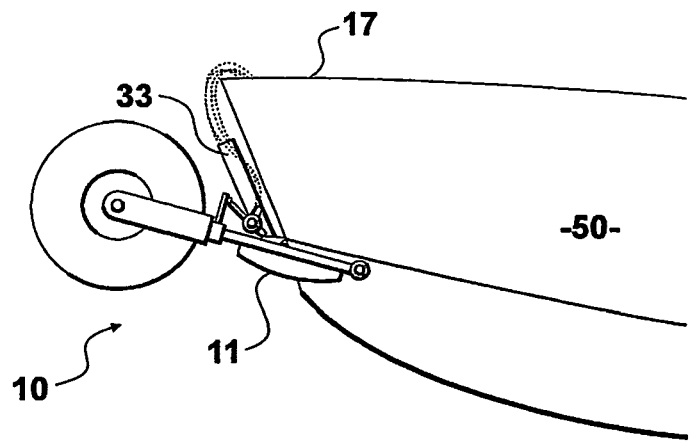
Figure 5:
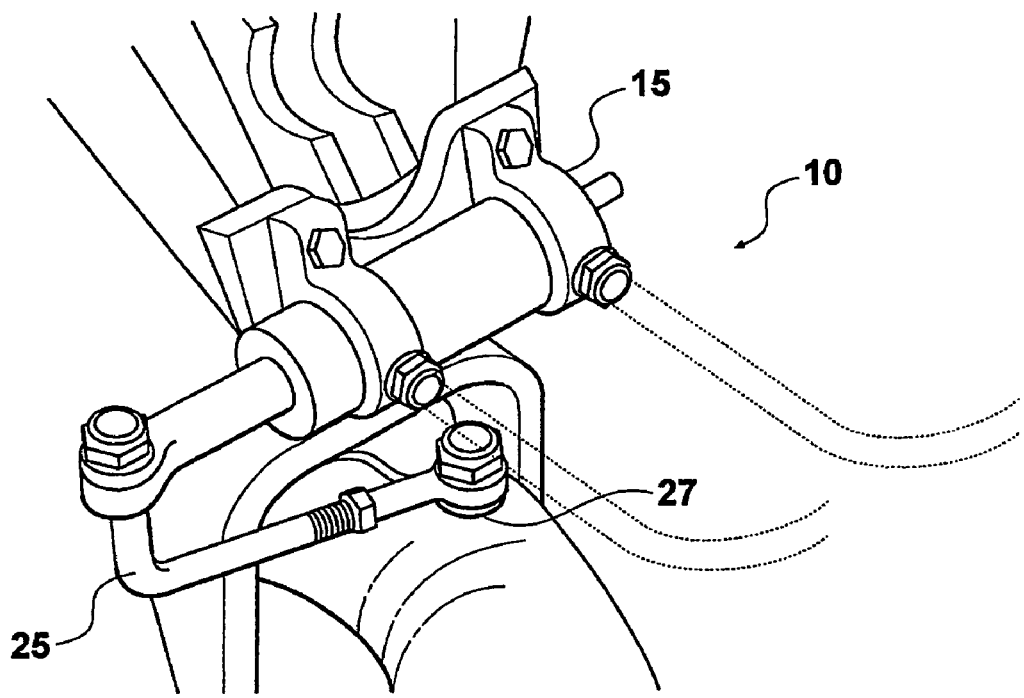
Figure 6:
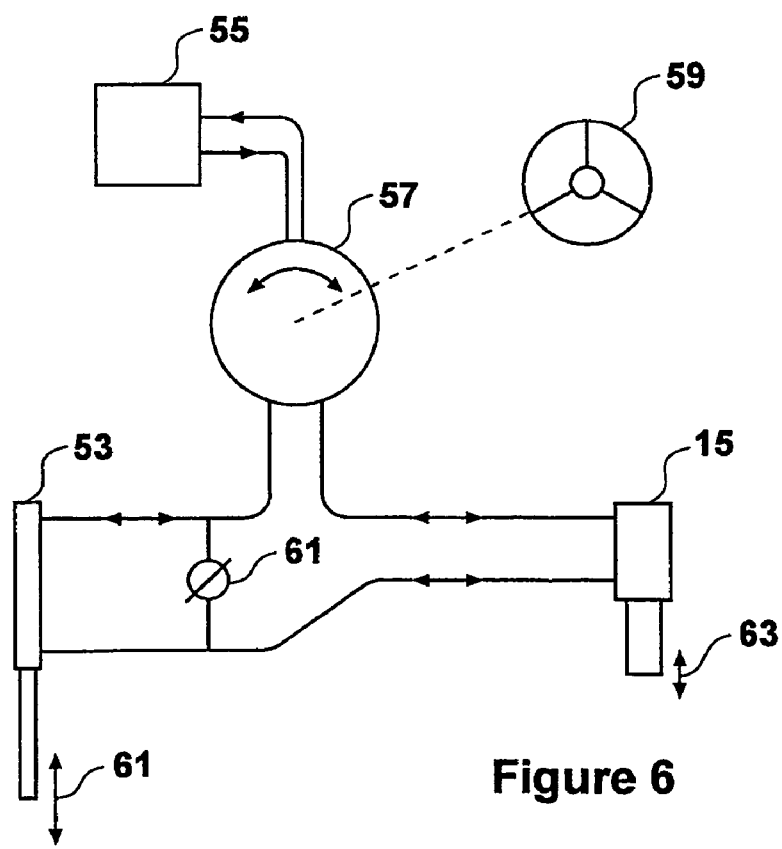

FIG. 1 is a perspective view of a first example of a steerable and retractable leg assembly, FIG. 2 is a side view of the steerable and retractable leg assembly shown in a fully extended position, FIG. 3 is a side view of the steerable and retractable leg assembly shown in an intermediate position, FIG. 4 is a side view of the steerable and retractable leg assembly shown in a fully retracted position, FIG. 5 is a perspective view of the steering actuator, FIG. 6 is a schematic diagram showing the basic components of a steering hydraulic circuit, Example 2

Figure 7:
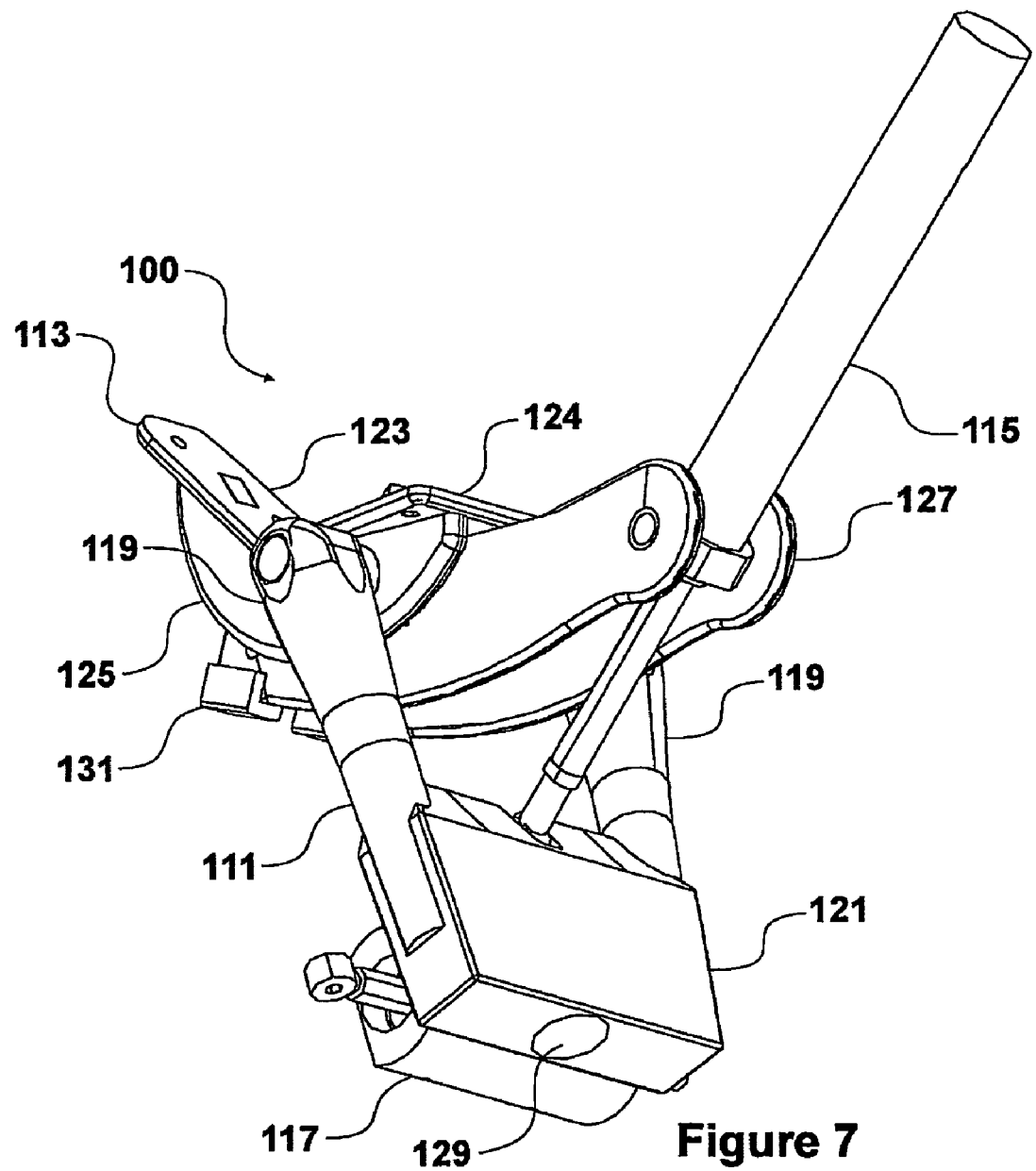
Figure 8:
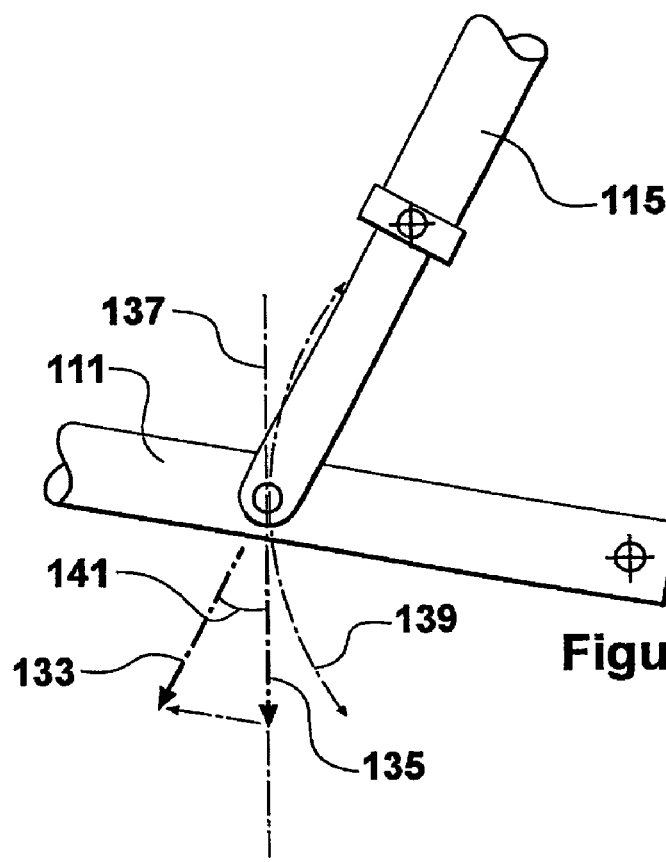

FIG. 7 is a perspective view of a second example of a steerable and retractable leg assembly, FIG. 8 is a schematic diagram showing a relationship between some of the forces experienced within the leg assembly.

Figure 9:
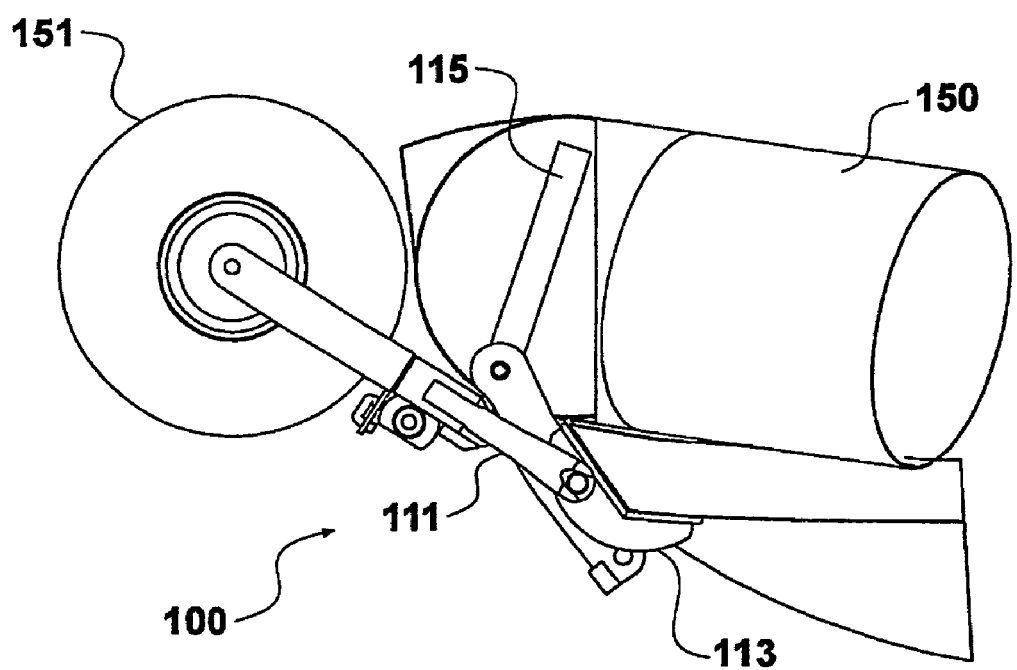
Figure 10:
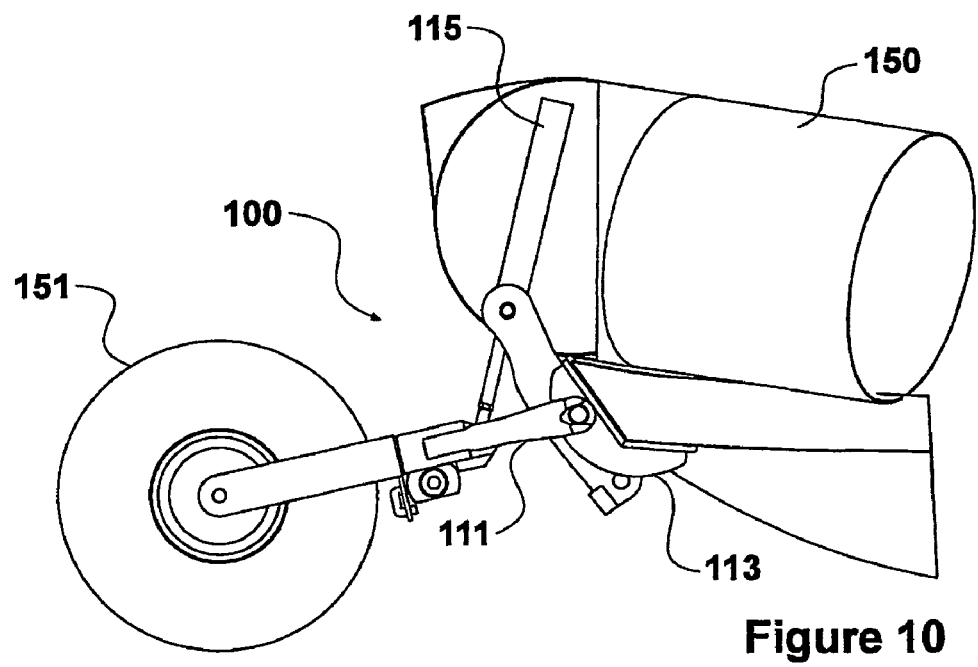
Figure 11:
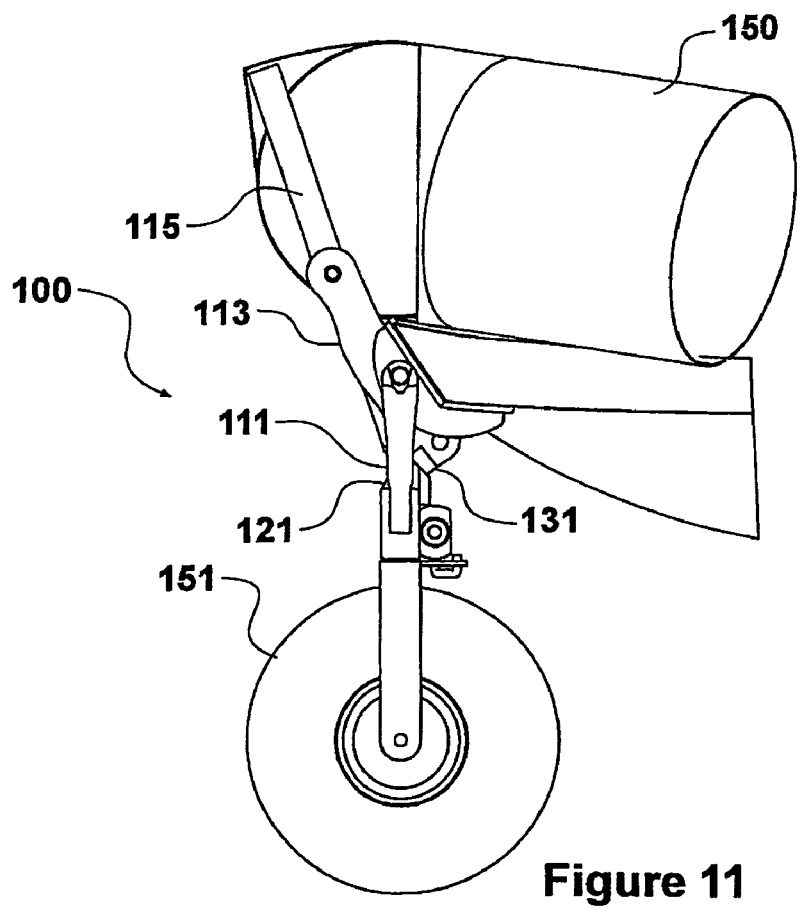
Figure 12:
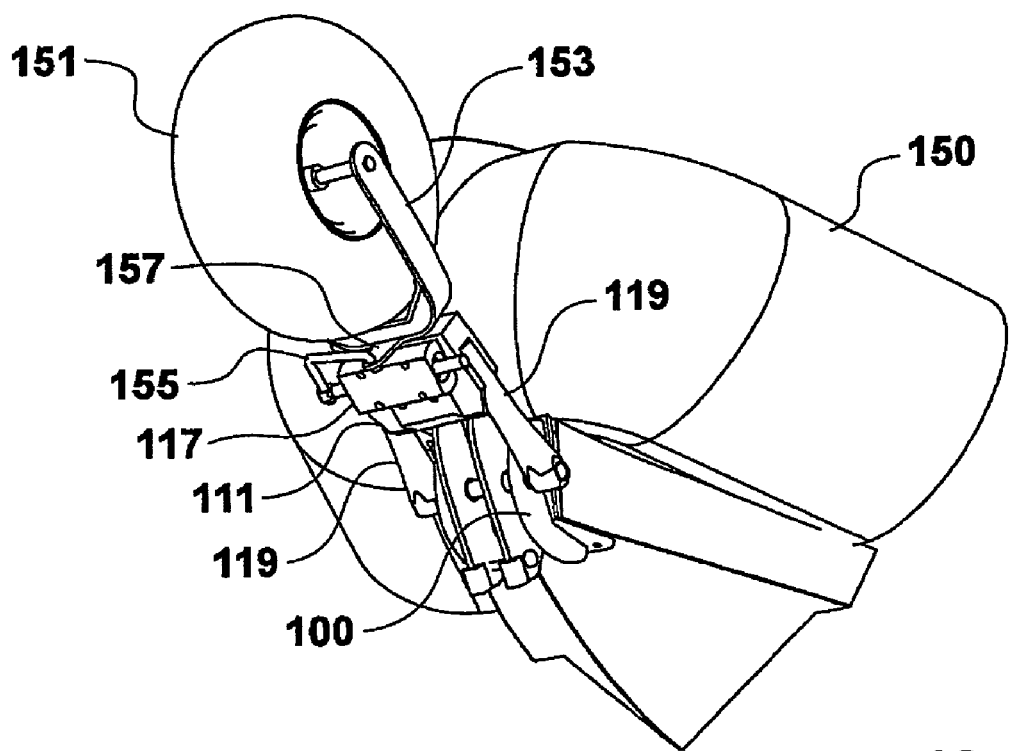
Figure 13:
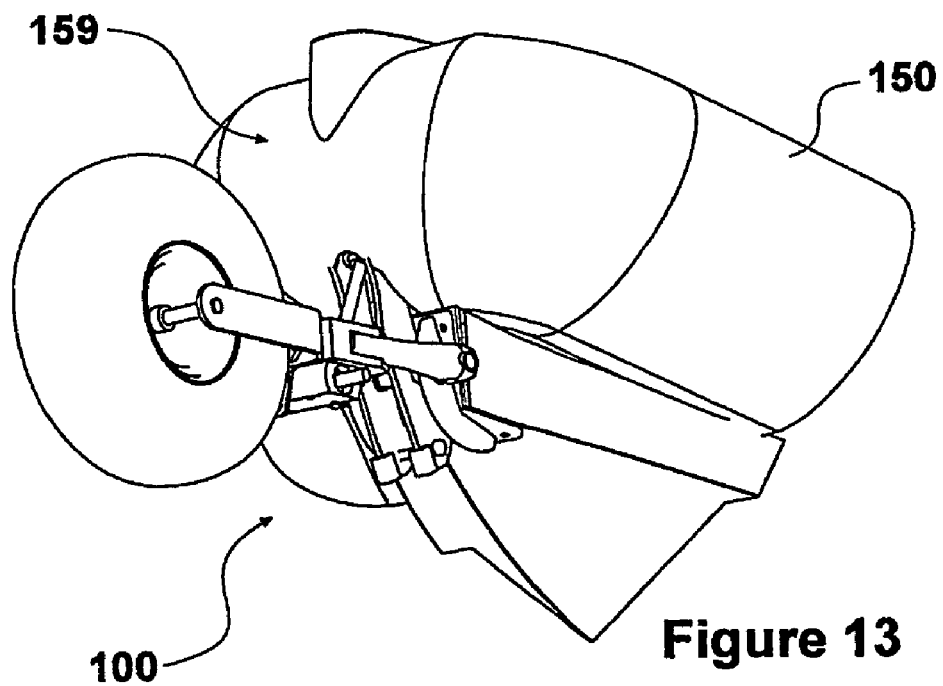
Figure 14:
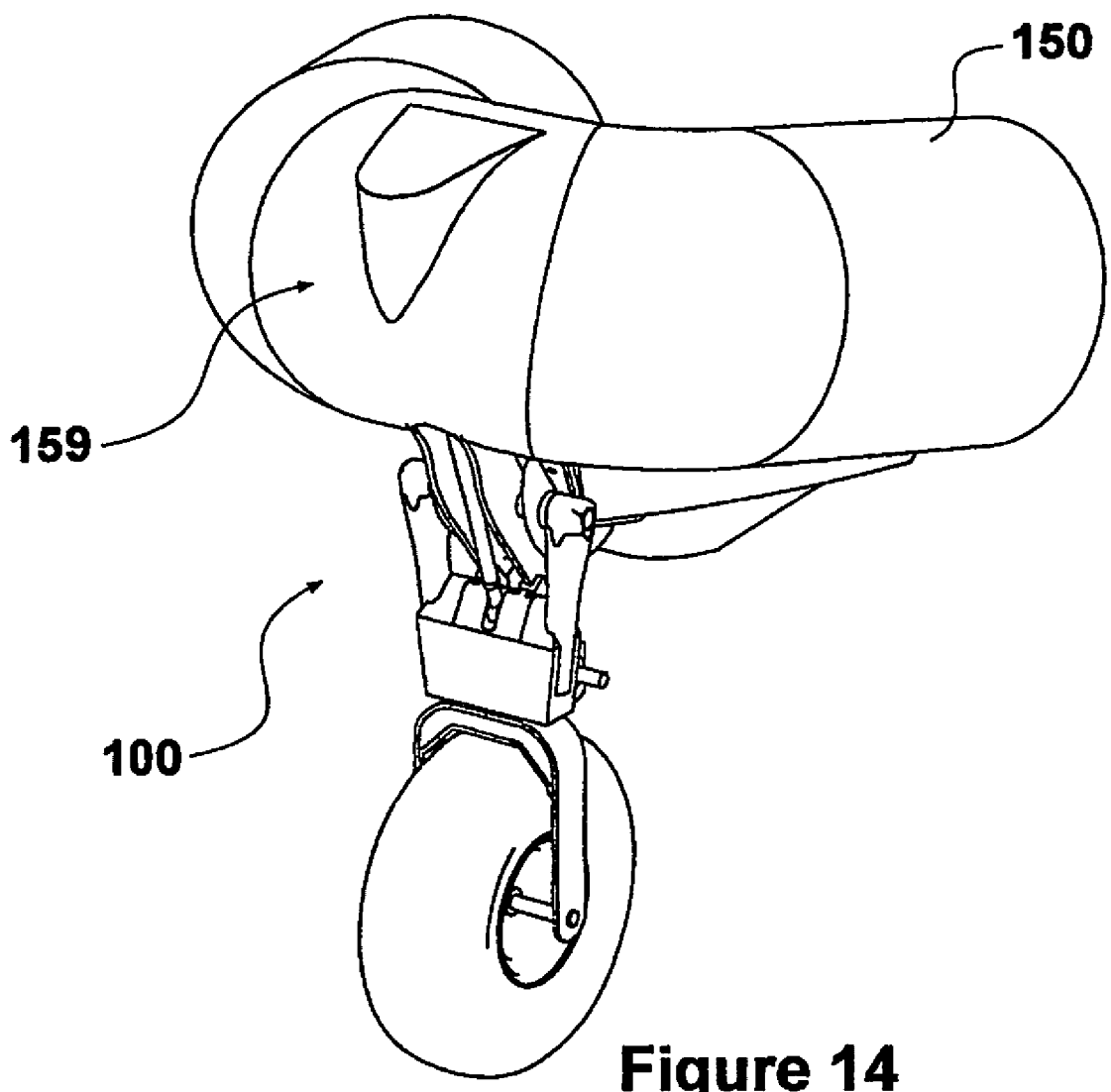

FIG. 9 is a side view of the steerable and retractable leg assembly in the retracted position, FIG. 10 is a side view of the steerable and retractable leg assembly in an intermediate position, FIG. 11 is a side view of the steerable and retractable leg assembly in the extended position, FIG. 12 is a perspective view of the steerable and retractable leg assembly in the retracted position, FIG. 13 is a perspective view of the steerable and retractable leg assembly in an intermediate position, and FIG. 14 is a perspective view of the steerable and retractable leg assembly in the extended position.

DETAILED DESCRIPTION OF THE PREFERRED EMBODIMENTS

Example 1

With reference to FIG. 1, a first example of a steerable and retractable leg assembly (10) is shown comprising a leg (11), a wheel (13) and a steering actuator (15). The leg (11) is shown pivotally mounted to the hull (17) of an amphibious vehicle via bearings (not shown) mounted in the hull (17) arranged about axis (19). In this example a shaft extends from one side of the hull (17) to the other, and the leg is supported by two bearings, one mounted within each side of the hull (17).

In the preferred form the axis (19) is above the waterline of the amphibious vehicle.

The leg (11) comprises a substantially triangular shaped upper frame assembly (21) and a yoke assembly (23). The yoke assembly (23) is pivotally mounted to the upper frame assembly (21) to allow steering of the wheel (13). To effect controlled steering of the wheel (13), the steering actuator (15) is provided. The steering actuator (15) is mounted onto the upper frame assembly (21) and acts via a connecting rod (25), and an arm (27) which is rigidly attached to the yoke assembly (23), to alter the orientation (29) of the yoke assembly (23).

In this example the steering actuator (15) is a hydraulically operated actuator. In a first prototype the hydraulic power is supplied to the steering actuator (15) via flexible hydraulic lines (31). However in a preferred embodiment, the hydraulic power is supplied via supply lines which are internal to or integral with the leg (11). This eliminates the problems caused by long flexible lines which are caused to move about during operation of the leg assembly (10).

Also shown in FIG. 1 is a linear actuator (33) which can be used to move the leg (11) from an extended position as shown to a retracted position. The linear actuator (33) is mounted onto a fitting attached to the hull (17) by a pivoting joint (34), and the rod (36) of the actuator (33) is pivotally connected to a bracket (12) on the leg (11). Extension or retraction (35) of the rod (36) of the actuator (33) causes the leg (11) to move in a direction (37) to a retracted or an extended position. As the leg (11) moves to a retracted or extended position, the actuator (33) rotates in a movement (39). To allow for this movement (39), and to keep the overall configuration compact, the hull (17) has been appropriately shaped providing a recess (41) into which the actuator can travel.

Not shown in FIG. 1 are pontoons which are fitted to the exterior of the hull of the amphibious vehicle (17). The leg (11) and wheel (13) when in a retracted position lie between the forward ends of the pontoons mounted to each side of the hull (17).

With reference to FIGS. 2, 3 and 4, three side views are provided of the steerable and retractable leg assembly (10) fitted to the hull (17). FIG. 2 shows the leg assembly (10) in an extended position, FIG. 3 shows the leg assembly (10) in an intermediate position part way between an extended position and a retracted position, and FIG. 4 shows the leg assembly (10) in a fully retracted position. In these views the pontoons of the amphibious vehicle (50) are not shown.

A number of advantageous features of the operation of the linear actuator (33) can be seen in the sequence of views. The actuator (33) is pivotally mounted (34) to the hull (17) and pivots about the end of the actuator cylinder from which the rod (36) extends. It is positioned relative to the leg (11) in such a way as to operate at or near a right angle, or at least at an effective crank angle, to the leg (11). That is, as the leg (11) rotates from an extended position to a retracted position, the actuator (33) pivots about its mounting point, and maintains an angle as close as possible to 90 degrees to the longitudinal axis of the leg (11) throughout the greater part of the movement of the leg (11). This means that the leg (11) experiences a force the same as, or close to, the maximum force that the actuator (33) can exert throughout the greater part of the movement of the leg (11), or put another way, the force exerted by the actuator (33) is not significantly reduced during the greater part of the movement of the leg (11) due to operation of the actuator at an inefficient crank angle relative to the leg (11).

This has four principal advantages. Firstly, the actuator (33) can act as a robust up-lock actuator, that is it can support the leg (11) in the retracted position even during operation of the vehicle (50) in rough seas. Secondly, the actuator (33) can act as a robust down-lock actuator, that is it can support the leg (11) in the extended position and act as a sturdy brace during ground operations. Thirdly, the actuator (33) can act with sufficient force to move the leg (11) from the retracted position to the extended position when the vehicle (50) is on dry ground, allowing the vehicle (50) to lift itself off the ground, or conversely to lower itself onto the ground—see FIG. 3 in which the actuator (33) is operating at very close to 90 degrees to the leg (11) at the time when the vehicle (50) would begin to lift off the ground. And fourthly, the steerable and retractable leg assembly (10) forms a relatively compact configuration in the retracted position—this can be seen most clearly in FIG. 4.

In addition to all of these advantages, the steerable and retractable leg assembly (10) is compact when the leg (11) is in the retracted position, and yet provides considerable ground clearance for the vehicle when the leg (11) is in the extended position.

With reference to FIG. 5, a perspective view is provided showing the steering actuator (15) and the connecting rod (25) attached to the arm (27). Operation of the steering actuator (15) causes the arm (27) to move, and since the arm (27) is rigidly connected to the yoke (23) the orientation of the wheel (13) will be altered.

With reference to FIG. 6, a schematic diagram shows the basic components of a steering hydraulic circuit suitable for use with the leg assembly (10). The inventor has found that it is convenient to integrate the ground based steering system with the waterborne steering system of the amphibious vehicle, that is to integrate the ground based steering system with the steering system of an outboard motor for example. To avoid the need for complex systems to engage or disengage the ground based steering and/or the waterborne steering, the two systems are integrated so that they both operate all of the time.

To achieve this both the waterborne steering system actuator (53) and the ground based steering system actuator (15) are linked in series. To enable this method to work, the fluid volume displacements of the waterborne steering system actuator (53) and the ground based steering system actuator (15) need to be matched. That is, if it takes 200 millilitres of fluid to displace the waterborne steering system actuator (53) from a central steering position to full left, then the ground based steering system actuator (15) is sized in respect of diameter and stroke to use the same volume of fluid to move from a central steering position to full left position. Those skilled in the art will appreciate that a narrow actuator (53) with a long stroke (63) may be matched with a larger diameter actuator (15) of shorter stroke (63) and still meet the requirements of similar fluid volume displacement.

FIG. 6 shows a hydraulic circuit in which a hydraulic power supply (55) supplies hydraulic fluid at pressure to a steering control valve (57). The steering control valve is controlled via inputs from the vehicle's steering wheel (59). From the steering control valve (57) hydraulic fluid can be supplied in both directions to the waterborne steering system actuator (53) and the ground based steering system actuator (15) which are linked in series.

A manual bypass valve (61) can be used when required to synchronise the two actuators (53) and (15).

Example 2

With reference to FIG. 7, a second example of a steerable and retractable leg assembly (100) is shown comprising a leg (11), an adapter fitting (113), a retract actuator (115) and a steering actuator (117). The leg assembly (100) can be mounted to the hull of an amphibious vehicle by bolting the adapter fitting (113) to the hull of the vehicle. The retract actuator (115) is adapted to move the leg (111) through an arc of movement from a retracted position to an extended position and in the return direction. The leg (111) moves through an arc of just over 120 degrees when moving from the retracted position to the extended position.

Such a range of movement is advantageous in this application since the leg (111) must be oriented close to vertical when in the extended position to provide adequate ground clearance for an amphibious vehicle to which it is attached, and yet the leg (111) must be oriented well above a horizontal attitude when in the retracted position to keep it, and any wheel attached, above and clear of the water line of the amphibious vehicle. If the leg (111) only travelled through an arc of 90 degrees for example, the leg would have to be much longer to achieve the two requirements of an adequate ground clearance and a retracted position well clear of the water line.

The leg (111) comprises two struts (119), one end of each strut (119) being pivotally connected to the adapter fitting (113) and the other end of each strut (119) being connected to a mounting block (121).

The adapter fitting (113) comprises a pair of mounting plates (123) and (124) arranged at an angle to one another. These mounting plates (123) and (124) can be fastened to the hull of an amphibious vehicle. The adapter fitting (113) also comprises a pair of leg mounting lugs (125), a pair of actuator support lugs (127), and a pair of down stops (131).

The aft face of the mounting block (121) is adapted to mount the steering actuator (117). The mounting block (121) is also adapted to pivotally retain a wheel and yoke assembly within a central bore (129).

The retract actuator (115) is a hydraulic ram. The protruding end of the rod of the hydraulic ram is pivotally connected to the mounting block (121) of the leg (111), and the cylinder of the hydraulic ram is pivotally connected to the actuator support lugs (127) at a point on the cylinder which is adjacent to the end of the cylinder through which the rod extends. An advantage of pivotally connecting the retract actuator (115) in this manner is that the retract actuator (115) is able to rotate about its pivotal connection with the actuator support lugs (127) allowing the actuator (115) to act at an angle of less than 30 degrees to a tangent to the arc of movement of the leg (111) throughout a significant portion of the arc of movement of the leg (111) from the retracted position to the extended position and in the return direction. Those skilled in the art will appreciate that when the actuator (115) is acting at an angle less than 30 degrees to the tangent to the arc of movement of the leg (111) the actuator can exert the greatest force on the leg, in the direction of the tangent, giving the actuator the optimal mechanical advantage over the movement of the leg (111). This is important, particularly during the first part of the travel of the leg (111) from the retracted position towards the extended position, since, if the amphibious vehicle has been lowered onto the ground, it will be necessary for the actuator (115) to exert enough force on the leg (111) to lift the vehicle off the ground.

With reference to FIG. 8 the force exerted by the actuator (133), and the resultant force (135) in a direction aligned with a tangent (137) to the arc of movement (139) of the leg (111), are shown in schematic form. The magnitude of the resultant force (135) is dependant on the angle (141) between the force exerted by the actuator (133) and the tangent (137), and can be calculated as the force exerted by the actuator (133) multiplied by cosine of the angle (141). When the angle (141) is in the range of 0 degrees to 30 degrees, the resultant force (135) is at least 86 percent of the force exerted by the actuator (133), since cosine of 0 degrees is 1.000 and cosine of 30 degrees is 0.866.

It is considered that when the angle (141) is within the range of 0 to 30 degrees that the retract actuator is able to apply an optimised force to the leg (111) in the direction of the tangent to the arc of movement of the leg (111). Having said this, for any angle (141) within the range of 0 to 45 degrees, the resultant force (135) will be at least 70 percent (cosine of 70 degrees is 0.707) of the force exerted by the actuator (133), providing a resultant force (135) that is very close to the optimal range.

With reference to FIGS. 9, 10 and 11 the retractable leg assembly (100) is shown fitted to the bow of an amphibious vehicle (150), the adapter fitting (113) being fastened to a hard point in the bow of the vehicle (150). Only the forward end of the vehicle (150) is shown.

In these three figures the retractable leg assembly (100) is shown in three positions within its arc of movement, that is, in the fully retracted position in FIG. 9, in an intermediate position in FIG. 10, and in the fully extended position in FIG. 11. The arc of movement of the leg (111) is entirely outside of the water-tight structure of the amphibious vehicle (150), meaning that the amphibious vehicle (150) does not need to have any moveable doors or moveable fairings to accommodate the retractable leg assembly (100).

In FIG. 9 it can be seen that the retract actuator (115) is at an angle of approximately 15 degrees to the tangent to the arc of movement of the leg (111). At this angle the resultant force on the leg (111) in the direction aligned with the tangent to the arc of movement of the leg (111) is 97 percent of the force exerted by the actuator, since cosine of 15 degrees is 0.97. This enables the actuator (115) to positively hold the leg (111) in the retracted position, negating the requirement for any additional mechanisms or uplocks to hold the leg in the retracted position. Such a positive hold on the leg (111) is particularly advantageous when the amphibious vehicle is operated in rough water and when there are significant forces acting to bounce the leg (111) up and down. And the elimination of any need for additional mechanisms or uplocks to hold the leg in the retracted position keeps the retractable leg assembly (100) simple and easier to maintain.

When the leg (111) is held in this retracted position, the wheel (151) attached to the leg (111) can be stored in a position that is immediately forward of the bow of the vehicle (150), and above the water line of the vehicle (150). Such a storage location is advantageous since the wheel (151) can double as a bumper when the amphibious vehicle (150) is operated on the water.

In FIG. 10 it can be seen that the retract actuator (115) is at an angle of approximately 25 degrees to the tangent to the arc of movement of the leg (111). At this angle the resultant force on the leg (111) in the direction aligned with the tangent to the arc of movement of the leg (111) is 91 percent of the force exerted by the actuator, since cosine of 25 degrees is 0.91. This means that the actuator is able to efficiently move the leg (111) towards the extended position allowing the retractable leg assembly to be used to lift the amphibious vehicle if the vehicle has been lowered onto the ground. If the retract actuator (115) was not aligned so closely with the tangent to the arc of movement of the leg (111) a larger and heavier actuator would be required.

In FIG. 11 the leg (111) is in the fully extended position. In this position the actuator (115) is at a large angle to the direction aligned with the tangent to the arc of movement of the leg (111), however in this position the primary forces on the leg (111) are compression forces resulting from the leg (111) carrying a portion of the weight of the amphibious vehicle (150) and rearward acting forces which may be experienced when the amphibious vehicle is travelling forward and the wheel (151) contacts objects or bumps, etc. These rearward acting forces are reacted primarily by the contact of the mounting block (121) of the leg (111) with the down stops (131) located on the adapter fitting (113). For this reason it is of little consequence that the actuator (115) is at a large angle to the direction aligned with the tangent to the arc of movement of the leg (111).

With reference to FIGS. 12, 13 and 14 the operation of the leg assembly (100), fitted to an amphibious vehicle (150), is shown in a series of perspective views. It can be seen that the wheel (151) is supported by a yoke assembly (153). In this example the wheel (151) has a balloon type all terrain tire fitted to it. An advantage in using a balloon type all terrain tire is that the tire provides a useful degree of cushioning between the vehicle and any uneven terrain, reducing or eliminating the requirement to include a shock strut within the leg assembly (100).

In FIG. 12 the arrangement of the connection between the steering actuator (117) and the yoke assembly (153) is shown. A connecting link (155) provides a connection between the steering actuator (117) and a torque arm (157) which extends from the yoke assembly (153). Operation of the steering actuator (117) causes the orientation of the yoke assembly (153) to change with respect to the leg (111), enabling the amphibious vehicle (150) to be steered when the vehicle (150) is being operated on land.

Hydraulic inputs to the steering actuator (117) are transmitted via conduits contained within the struts (119) of the leg (111). This has the advantage of eliminating exposed hydraulic lines down the leg (111), making the entire leg assembly (100) neater and less prone to damage.

FIGS. 13 and 14 show the leg assembly (100) in the intermediate positions and the extended positions respectively. It can be seen that the actuator (115) is substantially housed within a fixed fairing panel (159) which forms the nose of the amphibious vehicle (150). The fixed fairing panel (159) defines a cavity which is outside of the water-tight structure of the amphibious vehicle (150) and therefore there is no requirement for any movable doors or sealing arrangements to be associated with the fixed fairing panel (159).

Variations

Electrically, pneumatically or manually powered actuators can be used in place of any of the hydraulically powered actuators (15), (33), (115) or (117).

The leg (11) can rest against a hard point on the hull of the amphibious vehicle (17) when in the extended position to help transmit loads between the leg (11) and the hull of the amphibious vehicle (17) during ground operations. To this effect a vee shaped block of a resilient material, for example rubber, can be secured to the leg (11), the vee shaped block being so sized, shaped and oriented to mate with the lower surface of the hull (17) of any vehicle (50) to which the leg (11) is attached. Additional structure can be added to the hull of the vehicle to help spread the loads into the hull.

In a further variation the wheel (13) or (151) could be powered, for example using a hydraulic motor mounted within the hub of the wheel (13) or (151).

Advantages

Thus it can be seen that at least the preferred form of the invention provides a retractable leg assembly which is simple and robust, and which uses up very little living space of the amphibious vehicle. This is advantageous.

Throughout this specification the word "comprise" and variations of that word, such as "comprises" and "comprising", are not intended to exclude other additives, components, integers or steps.

The invention claimed is:

1. A retractable leg assembly for an amphibious vehicle, comprising:
   an adapter fitting that is fastenable to a bow of the vehicle;
   a leg that is pivotally connected to the fitting; and
   a linear actuator that is pivotally connected with a pivotal connection both to the fitting and to the leg, the linear actuator having a cylinder and an extendable rod, the cylinder being pivotally connected to the fitting at or adjacent a rod end of the cylinder, the actuator being configured to move the leg through an arc of travel from a retracted position to an extended position, whereby the pivotal connection of the actuator when extended, is located in front of the leg assembly,
   wherein the actuator is movable about its pivotal connection in a manner ensuring that a force exerted on the leg by the actuator in a direction that is tangential to the arc of travel of the leg remains substantially optimal during a greater portion of the arc of travel, and
   the retractable leg assembly is a nose leg assembly located outside a hull of the amphibious vehicle without moving through an overall streamline or watertight skin of the hull, the actuator traveling in a recess provided in the hull.

2. A retractable leg assembly as claimed in claim 1, wherein an arrangement of the leg and the actuator is adapted to move the leg through the arc of travel from the retracted position to the extended position, and during the travel the actuator moves about its pivotal connection to the fitting in a manner to ensure that the force exerted on the leg by the actuator in a direction that is tangential to the arc of travel of the leg remains substantially optimal during a portion of the arc of travel.

3. A retractable leg assembly as claimed in claim 1, wherein the arc of travel is sufficient to allow a greater part of the leg to be raised above a water line of the vehicle.

4. A retractable leg assembly as claimed in claim 1, wherein the actuator is configured to move the leg through an arc of travel from the retracted to the extended positions that is equal to or greater than one hundred and twenty degrees.

5. A retractable leg assembly as claimed in claim 1, wherein the retractable leg assembly includes a mounting means for at least one ground engagement means or wheel.

6. A retractable leg assembly as claimed in claim 5, wherein the retractable leg assembly includes a steering actuator means which is adapted to control the orientation of the wheel relative to the retractable leg assembly.

7. A retractable leg assembly as claimed in claim 1, wherein the adapter fitting includes a down stop adapted to limit the travel of the leg at the extended position.

8. A retractable leg assembly as claimed in claim 5, wherein the leg assembly is adapted to position the wheel, when in the retracted position, in such a manner that the wheel can be used as a bumper or fender.

9. An amphibious vehicle incorporating at least one retractable leg assembly substantially as claimed in claim 1.

10. An amphibious vehicle as claimed in claim 9, wherein the path of travel of the leg from the retracted position to the extended position is external from a substantially water-tight structure of the amphibious vehicle.

11. A retractable leg assembly as claimed in claim 2, wherein the retractable leg assembly includes a mounting means for at least one ground engagement means or wheel.

12. A retractable leg assembly as claimed in claim 1, wherein the retractable leg assembly includes a mounting means for at least one ground engagement means or wheel.

13. A retractable leg assembly as claimed in claim 11, wherein the retractable leg assembly includes a steering actuator means which is adapted to control the orientation of the ground engagement means or wheel relative to the retractable leg assembly.

14. A retractable leg assembly as claimed in claim 12, wherein the retractable leg assembly includes a steering actuator means which is adapted to control the orientation of the ground engagement means relative to the retractable leg assembly.

15. A retractable leg assembly for an amphibious vehicle, comprising:
   an adapter fitting that is fastenable to a bow of the vehicle;
   a leg that is pivotally connected to the fitting; and
   a linear actuator that is pivotally connected with a pivotal connection both to the fitting and to the leg, the linear actuator having a cylinder and an extendable rod, the cylinder being pivotally connected to the fitting at or adjacent a rod end of the cylinder, the actuator being configured to move the leg through an arc of travel from a retracted position to an extended position, whereby the pivotal connection of the actuator when extended, is located in front of the leg assembly,
   wherein the actuator is configured to move the leg through an arc of travel from the retracted to the extended positions that is equal to or greater than one hundred and twenty degrees,
   wherein the retractable leg assembly is a nose leg assembly located outside a hull of the amphibious vehicle without moving through an overall streamline or watertight skin of the hull, the actuator traveling in a recess provided in the hull.

16. A retractable leg assembly as claimed in claim 15, wherein an arrangement of the leg and the actuator is adapted to move the leg through the arc of travel from the retracted position to the extended position, and during the travel the actuator moves about its pivotal connection to the fitting in a manner to ensure that the force exerted on the leg by the actuator in a direction that is tangential to the arc of travel of the leg remains substantially optimal during a portion of the arc of travel.

17. A retractable leg assembly as claimed in claim 15, wherein the is movable about its pivotal connection in a manner ensuring that the force exerted on the leg by the actuator in a direction that is tangential to the arc of travel of the leg remains substantially optimal during the greater portion of the arc of travel.

18. A retractable leg assembly as claimed in claim 15, wherein the arc of travel is sufficient to allow a greater part of the leg to be raised above a water line of the vehicle.

19. A retractable leg assembly as claimed in claim 15, wherein the retractable leg assembly includes a mounting means for at least one ground engagement means or wheel.

* * * * *